(12) United States Patent
Mori

(10) Patent No.: US 11,934,028 B2
(45) Date of Patent: Mar. 19, 2024

(54) OPTICAL MULTIPLEXER/DEMULTIPLEXER

(71) Applicant: Mitsubishi Electric Corporation, Tokyo (JP)

(72) Inventor: Kento Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 501 days.

(21) Appl. No.: 17/257,829

(22) PCT Filed: Oct. 11, 2018

(86) PCT No.: PCT/JP2018/037905
§ 371 (c)(1),
(2) Date: Jan. 4, 2021

(87) PCT Pub. No.: WO2020/075265
PCT Pub. Date: Apr. 16, 2020

(65) Prior Publication Data
US 2021/0294062 A1  Sep. 23, 2021

(51) Int. Cl.
*G02B 7/00* (2021.01)
(52) U.S. Cl.
CPC .................................. *G02B 7/006* (2013.01)
(58) Field of Classification Search
CPC ............................... G02B 7/006; G02B 27/10
See application file for complete search history.

(56) References Cited

U.S. PATENT DOCUMENTS 6,454,465 B1 * 9/2002 Uschitsky .......... G02B 6/29364
385/47

FOREIGN PATENT DOCUMENTS

| JP | 2007-163631 A | 6/2007 |
| JP | 4283048 B2 * | 6/2009 |
| WO | 2017/033230 A1 | 3/2017 |

OTHER PUBLICATIONS

JP 4283048 B2 : Arrai et al. : Translation from Japanese patent office (Year: 2009).*
International Search Report issued in PCT/JP2018/037905; dated Jan. 15, 2019.

* cited by examiner

*Primary Examiner* — Joseph P Martinez
(74) *Attorney, Agent, or Firm* — Studebaker & Brackett PC

(57) ABSTRACT

An optical multiplexer/demultiplexer comprises: a holder including a recessed portion formed on one surface in the holder in a rectangular parallelepiped shape whose shape of boundary line with the one surface is rectangular, and structural members, forming in pairs when viewed from the one surface, contacting with portions of opposing longer segments of the boundary line, or crossing along longitudinal sections approximately equal to portions of the opposing longer segments; and optical components on which curved planes are formed by coating a surface treatment film, wherein the structural members and the optical components are formed in pairs and placed to overlap on each other so that the curved planes of the optical components have contacts with the holder, and the optical components are connected on the holder, among edge portions of the holder in contact with the optical components, at least, at three edge portions thereof forming a plane.

16 Claims, 6 Drawing Sheets

OPTICAL MULTIPLEXER/DEMULTIPLEXER

TECHNICAL FIELD

The present disclosure of the application concerned relates to an optical multiplexer/demultiplexer.

BACKGROUND ART

In optical components such as filters used for a conventional optical multiplexer/demultiplexer, square or rectangular holes are formed as pass-through holes of light rays, for the sake of an object to prevent or curb the attenuation of light rays, whereby a configuration therefor is adopted in which the interior is made hollow. However, in the configuration, the prevention of causing inclination of the optical components as geometrical adjustment thereof is not intended, and, in addition, neither restriction nor limitation is given on the shapes of the holes or channels (for example, refer to Patent Documents 1 and 2).

Moreover, at the time of connecting an optical component(s) with respect to an optical multiplexer/demultiplexer, there arises a problem in that, when the inclination is caused thereto, a plurality of light rays cannot be combined together into one.

RELATED ART DOCUMENTS

Patent Documents

[Patent Document 1] Japanese Patent Laid-Open No. 2007-163631
[Patent Document 2] International Publication No. 2017/033230

SUMMARY OF THE INVENTION

Problems to be Solved by the Invention

In a conventional optical multiplexer/demultiplexer, which is configured as described above, it is stated that the optical multiplexer/demultiplexer has pass-through holes toward the side of a free space (s). However, because those pass-through holes are square or rectangular holes, there is no effect on the prevention of causing inclination of an optical component(s) such as a filter or the like; in particular, when a shape of connecting surfaces of optical components each with an optical multiplexer-demultiplexer's body is not a flat plane but a curved plane, there arises a problem in that the inclination of an optical component(s) cannot be reduced with respect to the optical multiplexer-demultiplexer's body for which a glass holder or the like is used.

The present disclosure in the application concerned has been directed at disclosing technologies for resolving those problems as described above, an object of the disclosure is to curb causing the differences of inclination angles between a plurality of optical components themselves with respect to an optical multiplexer-demultiplexer's body, at the time of connecting the optical components each being components subject to connection onto the optical multiplexer-demultiplexer's body.

Means for Solving the Problems

An optical multiplexer/demultiplexer disclosed in the disclosure of the application concerned is an optical multiplexer/demultiplexer which comprises:

a holder, being either light-transmissive or metal-made, including a recessed portion formed on one surface in an optical multiplexer-demultiplexer's body in a rectangular parallelepiped shape whose shape of boundary line with the one surface is rectangular, and a plurality of structural members, forming in pairs when viewed from the one surface, contacting with portions of opposing longer segments of the boundary line, or crossing along longitudinal sections approximately equal to portions of the opposing longer segments thereof; and a plurality of optical components on which curved planes are each formed by means of coating a surface treatment film, wherein the structural members and the optical components are formed in pairs and placed to overlap on each other so that the curved planes of the optical components each have contacts with the holder, and also the optical components are connected on the holder, among edge portions of the holder being positions in contact with the optical components each, at three edge portions of the holder by which a plane is formed.

Effects of the Invention

According to the optical multiplexer/demultiplexer disclosed in the disclosure of the application concerned, it becomes possible to curb causing the differences of inclination angles between a plurality of optical components themselves with respect to the optical multiplexer-demultiplexer's body, at the time of connecting the optical components each being components subject to connection onto an optical multiplexer-demultiplexer's body.

EMBODIMENTS FOR CARRYING OUT THE INVENTION

Embodiment 1

Figure 1A:
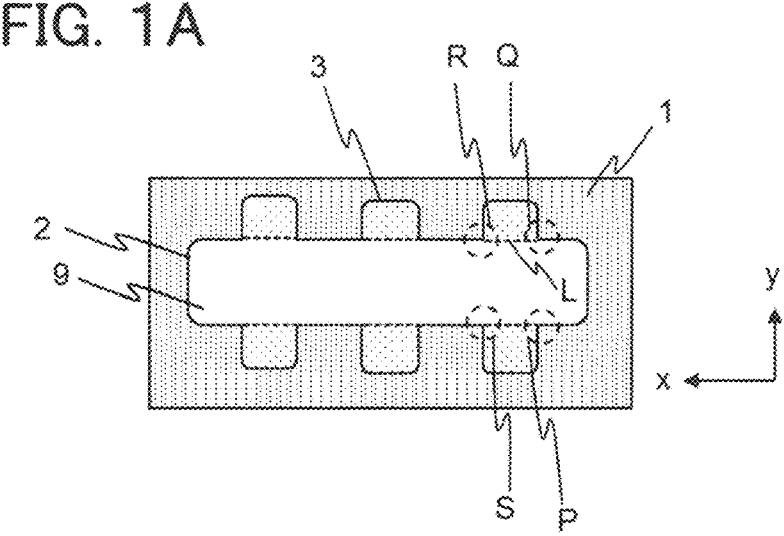
FIGS. 1A, 1B and 1C are diagrams each for explaining an example of an optical multiplexer/demultiplexer according to Embodiment 1.

Hereinafter, the explanation will be made referring to the drawings for an optical multiplexer/demultiplexer according to Embodiment 1.

Figure 1B:
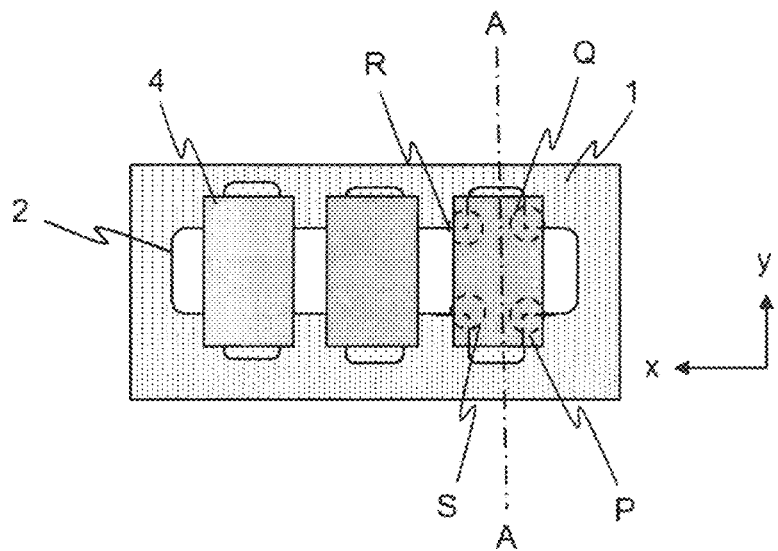
Figure 1C:
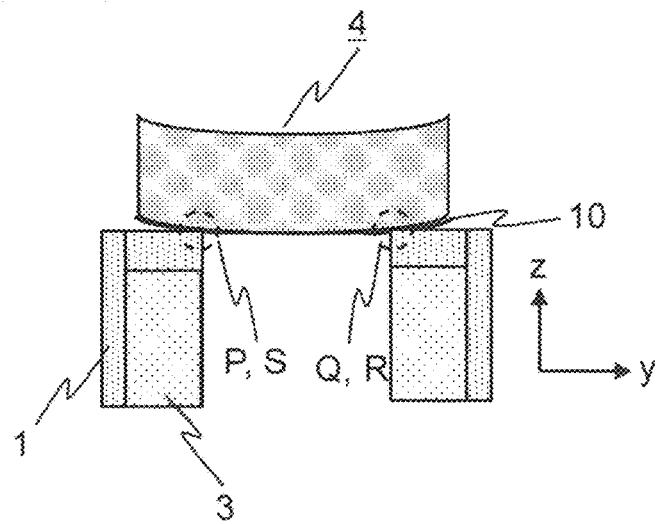

FIGS. 1A, 1B and 1C are diagrams each for explaining an example of the optical multiplexer/demultiplexer according to Embodiment 1. In these diagrams, FIG. 1A is a plan view of a light-transmissive (for example, glass made) holder 1 corresponding to an optical multiplexer-demultiplexer's body. In the interior of the holder 1, formed are a recessed portion 2 in which a boundary line thereof with a top-surface of the optical multiplexer-demultiplexer's body being in a rectangular parallelepiped shape is made as a rectangular shape, and paired structural members 3 (having through holes or channels therein when viewed from the top-surface of the holder) which are placed so as to have contacts with the boundary line of the recessed portion 2 from the outside of the recessed portion 2, and to mutually separate in a longitudinal direction of the recessed portion 2 while opposing to one another with respect to the longitudinal direction, when viewed from the top-surface. FIG. 1B is a plan view when filters 4 being optical components are placed on the top-surface of the holder 1. To be specific, upon the top-surface of the holder 1, the three rectangular filters 4 (hereinafter, a filter is also referred to as an optical component) are placed in prespecified pitch intervals in parallel with one another along an x-axis direction of the figure which is the longitudinal direction of the holder 1. FIG. 1C is a cross-sectional view showing a cross-section viewed along the line A-A of FIG. 1B. As shown in FIG. 1B or FIG. 1C, the optical multiplexer/demultiplexer according to Embodiment 1 is mainly constituted of the holder 1 and the filters 4 being a plurality of optical components. Note that, the properties of material of a light-transmissive holder are not limited to those of the glass made one as described above, and so, a plastic material may be used for the holder (which is applicable hereinafter in a similar fashion).

In ordinary cases, a surface treatment film 10 is formed as an optical reflection layer or film in its entirety on a surface (the bottom-side surface of the filter 4 in the figure) on a side where the filter 4 has contact with the holder 1, and so, it can be known that, as shown in the figure, a shape of the filter 4 takes on a curved plane being warped toward a z-axis direction (the top side) being a thickness-wise direction with respect to the surface of the holder 1. Namely, a feature resides in that, with respect to the top-surface of the holder 1, a surface of the filter 4 takes on the curved plane having a convex plane being downwardly convex in the z-axis direction by means of forming the surface treatment film 10.

In the optical multiplexer/demultiplexer in the embodiment, the filters 4 having the feature described above are assembled by bonding them by adhesion on the top-surface of the holder 1 by using an adhesive agent or the like, and thus, it can be said that the filters 4 each being optical components whose adhesion surfaces are rendered in roundness, namely, the filters each having curved planes whose adhesion surfaces are downwardly convex are connected onto the light-transmissive holder 1 corresponding to the optical multiplexer-demultiplexer's body in which the recessed portion 2 is formed.

In a case in which surfaces of the filters 4 each being optical components have the curved planes being warped in a thickness-wise direction as described above, and a case in which connecting surfaces of the filters 4 each with the holder 1 are the curved planes as described above, the filters 4 each are in contacts at two places and supported thereat among edge portions "P," "Q," "R" and "S" of the holder 1 (refer to the portions surrounded by the circles of broken lines in FIG. 1B and FIG. 1C), and are connected thereat, when viewed from an either side face in a longitudinal direction of the holder or in the short-side direction thereof, as this can be inferred on the analogy from FIG. 1C. Those edge portions are both of the edge portions of segments formed by straight lines each (for example, refer to the portion of broken lines indicated by symbol "L" in FIG. 1A) being constituted of common line segments, in an edge or contour line of the recessed portion 2 being a boundary line between the top-surface of the holder 1 and the recessed portion 2 thereof, between two line segments of the contour line forming longitudinal portions which are opposing to each other in a longitudinal direction of the recessed portion and line segments being formed between the paired structural members 3, each contacting individually with the boundary line from the outside of the paired structural members each, and the contour line in the longitudinal direction of the recessed portion, when viewed from the top-surface side of the holder 1.

Therefore, it can be understood that the filters 4 each have contacts at two places among the edge portions "P," "Q," "R" and "S" of the holder 1 when viewed from an either side face in the longitudinal direction of the holder or in the short-side direction thereof, and also that, in order to make connections at those contacting places, it is simply required to have connections at three different positions (three edge portions, for example, "P," "Q" and "R") which at least define a plane, among those four different positions (four edge portions).

As noted above, the filters 4 each result in being supported at a plurality of, three or more, edge portions of the holder 1; and thus, in comparison with a conventional case in which only a recessed portion is provided in the holder 1 so that edge portions are not formed, it becomes possible to curb causing the differences of inclination angles between a plurality of filters 4 themselves (three in the case of FIG. 1B) with respect to the holder 1 after the filters 4 have been connected on the holder 1. Or to put it another way, in a case where edge portions are not formed in the holder 1 as those described above, contact points between the surface on a side on which the surface treatment film 10 of the filters 4 each is formed and the holder 1 cannot be established in comparison with a case where the edge portions are formed, so that, when the plurality of filters 4 each and the holder 1 are connected to each other, it becomes easier to cause the differences in inclination angles between the filters themselves after their connections with respect to a top-surface of the holder taking on a reference plane.

Here, the inclination angle described above means an angle forming between a top-surface of a holder and a surface of a filter. To be specific, in FIG. 1B, by defining, for example, a plane determined by the centers of broken-line circles indicated by symbols "P," "Q" and "R" as a defined holder surface, an inclination angle is an angle which takes on between the normal of the defined holder surface and the normal of a tangential plane having contact at a point where a shape's midline of the filters 4 each intersects a surface on a side forming the surface treatment film 10 thereof.

It should be noted that, under actual circumstances, by making incident to light at a prespecified point(s) of the aforementioned filters and by using reflected light having been reflected by a reflection layer or film, it is possible to verify the presence or absence of causing the differences of inclination angles between the aforementioned plurality of filters themselves. And so, in the example of FIG. 1B, a plurality of light rays passing through those three filters cannot be combined together into one in a case in which, among the three filters being placed, an inclination angle with respect to a reference plane of one filter differs from inclination angles of the two other filters one another; and thus, inclination angles of the three filters can be easily adjusted so that they become the same within an allowable range. Here, in a case in which a through hole is formed in the recessed portion 2, it may be adopted that the properties of material of a holder are of metal such as aluminum, stainless steel or the like.

Embodiment 2

Hereinafter, the explanation will be made referring to the drawings for an optical multiplexer/demultiplexer according to Embodiment 2.

Figure 2:
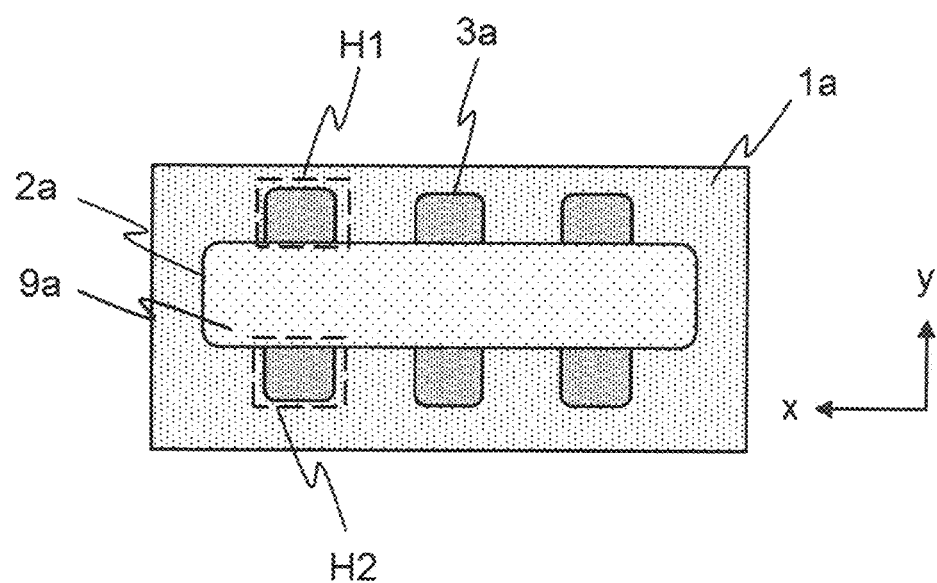
FIG. 2 is a diagram for explaining, by way of example, an optical multiplexer-demultiplexer's body of an optical multiplexer/demultiplexer according to Embodiment 2.

FIG. 2 is a diagram for explaining an example of the optical multiplexer/demultiplexer according to Embodiment 2. In Embodiment 1, the explanation has been made for a case in which the recessed portion 2 and the paired structural members 3, where both of them are made of through holes or channels, are formed in the holder corresponding to an optical multiplexer-demultiplexer's body; however, it may also be suitable for a holder using a recessed portion 2a and paired structural members 3a in which channels are formed in both of such a recessed portion 2 and such paired structural members 3, and the depth of a channel formed in the recessed portion and depths of channels of the paired structural members are set in such a manner that they differ from one another. However, in this case, the recessed portion 2a of the holder is made of a light-transmissive material.

To be specific, in the recessed portion 2a of a holder 1a, an oblong hole portion 9a in which a channel is formed is formed as shown in FIG. 2, and channels are formed in the paired structural members 3a in their entireties when viewed from their top faces (refer to the portions surrounded by the broken lines indicated by "H1" and "H2" in the figure). In this case, as for the paired structural members 3a, channels of the same shapes are formed. And then, a depth size of the channel of the oblong hole portion 9a and that of the channels of the paired structural members 3a each described above are mutually different.

Note that, it may be adopted that the recessed portion 2a of FIG. 2 is made by a channel, and that the paired structural members 3a, made by holes which pass through the entireties thereof.

In the same manner of Embodiment 1, in a case in which connecting surfaces of filters each with the holder 1a are the curved planes in shapes being downwardly convex as shown in FIG. 1C, the filters each result in having contacts at edge portions of the holder and being supported thereat, when viewed from an either side face in a longitudinal direction of the holder or in a short-side direction thereof, in the same manner of Embodiment 1.

In a similar manner to the case in Embodiment 1, filters are connected at the edge portions of a holder in contact with each other as described above; and thus, it becomes possible to curb causing the differences of inclination angles between the plurality of filters themselves after their connections with respect to the holder. In addition, without totally applying through holes to the configurations of the paired structural members 3a, production costs of the holder associated with processing or working thereon can be reduced in a case in which at least parts of the paired structural members are made of channels.

Embodiment 3

Hereinafter, the explanation will be made referring to the drawings for an optical multiplexer/demultiplexer according to Embodiment 3.

Figure 3A:
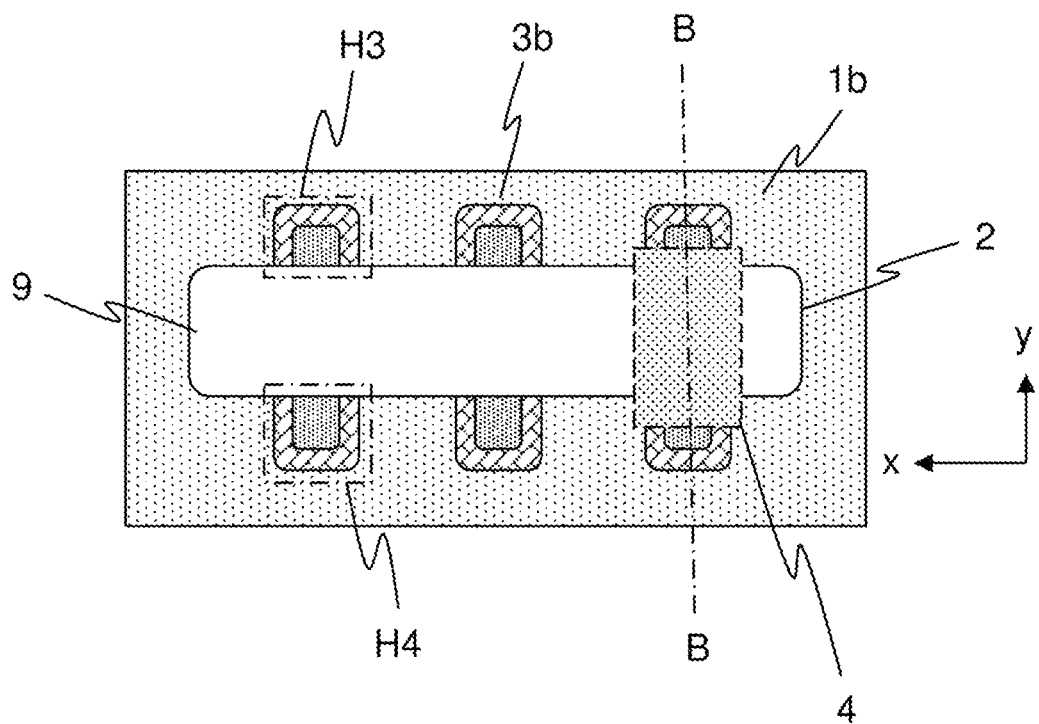
FIGS. 3A and 3B are diagrams each for explaining an example of an optical multiplexer/demultiplexer according to Embodiment 3.
Figure 3B:
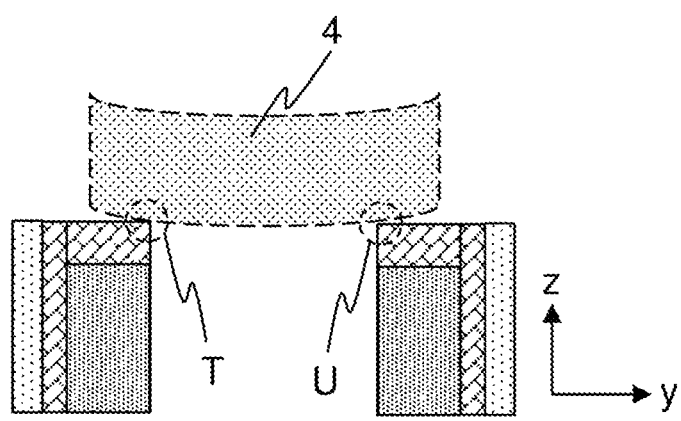

FIGS. 3A and 3B are diagrams each for explaining an example of the optical multiplexer/demultiplexer according to Embodiment 3. In Embodiment 3, paired structural members 3b are utilized. As for the paired structural members 3b, a holder 1b is constituted of, in each of the structural members as shown in FIG. 3A, the plurality of paired structural members 3b that are made by forming channels (refer to the portions surrounded by the alternate long and short dashed lines indicated by symbols "H3" and "H4" in the figure) or holes (not shown in the figure) in either a light-transmissive material or metal taking on the shapes of figure-U when viewed from a top-surface side of the holder, and of an oblong hole portion 9 which is passing through and is utilized as the recessed portion 2 of the holder 1b. Note that, FIG. 3B is a cross-sectional view showing a cross-section viewed along the line B-B of FIG. 3A.

In the optical multiplexer/demultiplexer according to Embodiment 3, the paired structural members 3b are connected onto the holder 1b in the number of plurality (three sets as the paired structural members in the figure), and then in a similar manner to Embodiment 1, upon the holder, such a filter 4 being an optical component (refer to the portion surrounded by the outline of broken lines in FIG. 3A and FIG. 3B each) whose adhesion surface with the holder 1b has a curved plane in a shape being downwardly convex in the thickness-wise direction as shown in in FIG. 3B is connected by using an adhesive agent or the like.

Note that, the oblong hole portion in Embodiment 3 may not be a through hole, but may also be a channel. In addition, in a case in which channels are formed in the paired structural members 3b, a channel depth of those channels thereof each and a channel depth of channels each utilized for grids thereof in the longitudinal direction may be different from each other in their magnitudes.

Also in the embodiment, when the filter 4 being an optical component has the curved plane whose connecting surface with the holder 1b is in a shape being downwardly convex as described above, the filter result in having contacts with the holder at edge portions of the paired structural members 3b in which channels or the like are formed, when viewed from an either side face in the longitudinal direction or in the short-side direction (refer to an edge portion "T" and an edge portion "U" in FIG. 3B, to the portions indicated by the circular marks of broken lines in the figure).

As noted above, filters each result in having contacts at the edge portions of the paired structural members 3b in which channels or the like are formed, and being supported thereat; and thus, it becomes possible to curb causing the differences of inclination angles between the plurality of filters themselves with respect to a holder after the filters have been connected on the holder at those edge points.

In addition, by separating the paired structural members 3b in which channels or the like are formed from one another without integrally making them as one, it is possible to commonly use the paired structural members 3b in the same shapes also in a case of a usage where there arise differences among pitches between filters themselves, being placement intervals between the filters themselves, representative of the distances between shape's midlines of adjacent filters in the longitudinal direction.

Embodiment 4

Hereinafter, the explanation will be made referring to the drawing for an optical multiplexer/demultiplexer according to Embodiment 4.

Figure 4:
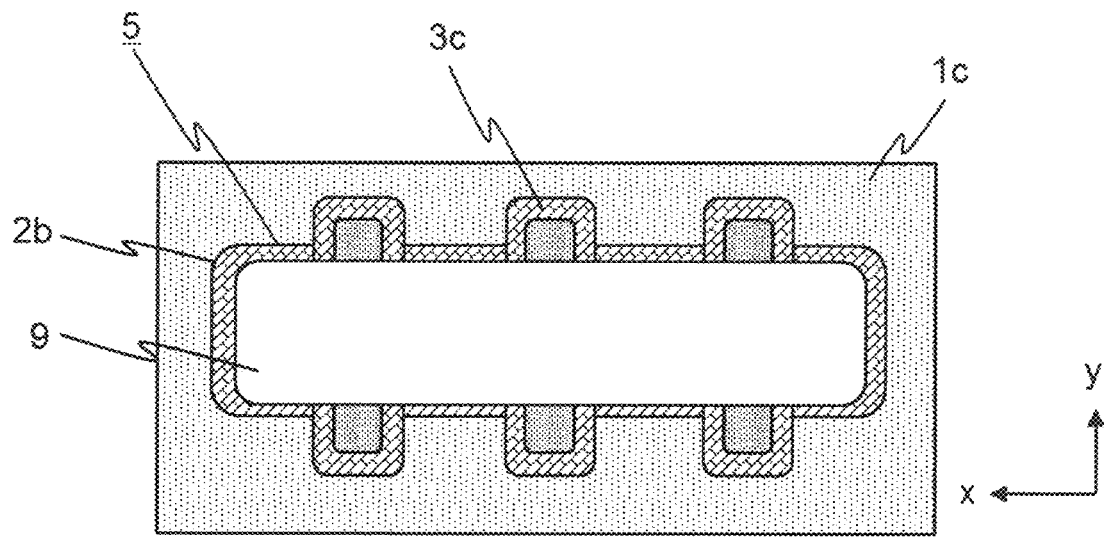
FIG. 4 is a diagram for explaining, by way of example, an optical multiplexer-demultiplexer's body of an optical multiplexer/demultiplexer according to Embodiment 4.

FIG. 4 is a diagram for explaining an example of the optical multiplexer/demultiplexer according to Embodiment 4. In Embodiment 3, structural members are shown in which the paired structural members 3b being either light-transmissive structural members or metal structural members are separated from one another; however, as shown in FIG. 4, an integrated structure member 5 may be used in which structural members of either a light-transmissive material or metal are utilized also for a recessed portion 2b which is integrally made in addition to paired structural members 3c. Note that, as shown in the figure, channels are formed in the paired structural members 3c each, and, in the recessed portion 2b, the oblong hole portion 9 that passes through it is formed. However, the oblong hole portion may be formed by a channel.

As shown in FIG. 4, when a filter being an optical component has a curved plane whose connecting surface with a holder 1c takes on being downwardly convex, the filter is made in contact and supported at a plurality of edge portions of the paired structural members 3c in each of which a channel is formed, when viewed from an either side face in the longitudinal direction or in the short-side direction, in a similar manner to Embodiment 3.

As noted above, filters each are made in contacts at the plurality of edge portions of the paired structural members 3c in which channels are formed, and are connected thereat; and thus, it becomes possible to curb mutually causing the differences between inclination angles of the plurality of filters with respect to a holder after the filters have been connected on the holder. In addition, by integrally making the paired structural members 3c in which the channels are formed are combined with the recessed portion 2b, the number of connections of the paired structural members 3c onto the holder is reduced in comparison with a case in which they are separated from one another, whereby it results in enhancing the accuracy of connection-setting positions after the connections.

Embodiment 5

Hereinafter, the explanation will be made referring to the drawings for an optical multiplexer/demultiplexer according to Embodiment 5.

Figure 5:
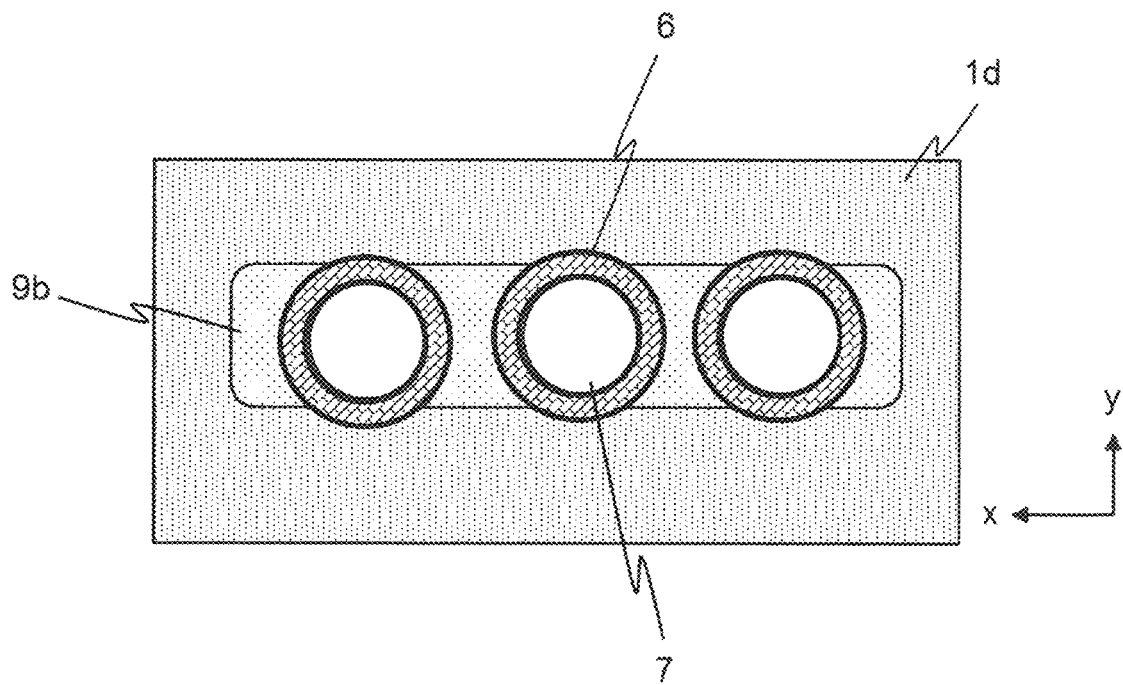
FIG. 5 is a diagram for explaining, by way of example, an optical multiplexer-demultiplexer's body of an optical multiplexer/demultiplexer according to Embodiment 5.

FIG. 5 is a diagram for explaining an example of the optical multiplexer/demultiplexer according to Embodiment 5. In Embodiment 3, by forming holes or channels, structural members are shown in which the paired structural members 3b taking on the shapes of figure-U viewed from a top-surface of the holder are provided therefor in a plurality of structural members; however, in place of those structural members, it may also be suitable for using cylindrical-shaped structure members 6 in which circular-shaped holes 7 are formed in columned structure bodies being either made of a light-transmissive material or metal-made as shown in FIG. 5, or using columned structure members 8 in which channels are formed therein (not shown in the figure). In addition, an oblong hole portion 9b of a holder 1d may be either a through hole or a channel, or may also be omitted.

In a case in which filters being optical components each have a warped edge or contour line and their connecting surface with the holder 1d has the curved plane in a shape being downwardly convex similarly as shown in FIG. 1C, and also a case in which the filters are bonded by adhesion onto the holder 1d at the connecting positions, the filters each result in having contacts and being supported on the contour lines in circular shapes being a boundaries on cylindrically inner sides on top-face sides of either the cylindrical-shaped structure members 6 in which the circular-shaped holes 7 are formed therein as shown in FIG. 5 or the columned structure members 8 in which channels are formed therein (not shown in the figure), when viewed from an either side face in the longitudinal direction of the holder 1d or in the short-side direction thereof. Note that, in the embodiment, the number of the cylindrical-shaped structure members 6 described above or that of the columned structure members 8 in which channels are formed therein is made in the same number of the filters.

As noted above, filters each are made in contacts on the contour lines in circular shapes being boundaries on cylindrically inner sides of the cylindrical-shaped structure members 6, and are connected at those positions; and thus, it becomes possible to curb causing the differences of inclination angles between the plurality of filters themselves with respect to the holder 1d after the filters have been connected on the holder. In addition, by utilizing the cylindrical-shaped structure members 6, it is not necessarily required to place filters, for example, perpendicularly with respect to the x-axis direction at the time of connecting the filters onto the holder 1d (it is also possible to place them not being perpendicularly, but being angled to a certain extent), so that it becomes easier to perform the adjustment of those positions.

Note that, in the optical multiplexers/demultiplexers of Embodiments 1 to 5 described above, a top face of each of the structural or structure members does not protrude from a top-surface of a holder also in any one of the embodiments, and the top face thereof is set at the same height or less with respect to the top-surface of the holder; and in addition, as for metal thereof in Embodiments 3 to 5, for example, aluminum, stainless steel or the like can be named.

Figure 6A:
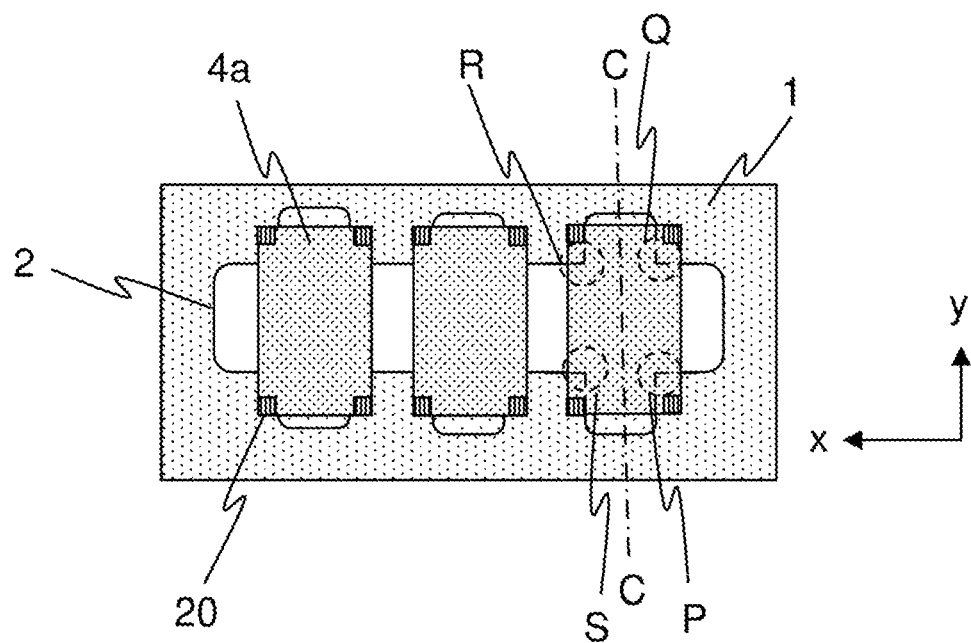
FIGS. 6A and 6B are diagrams each for explaining another example with respect to the optical multiplexers/demultiplexers according to Embodiments 1 to 5.
Figure 6B:
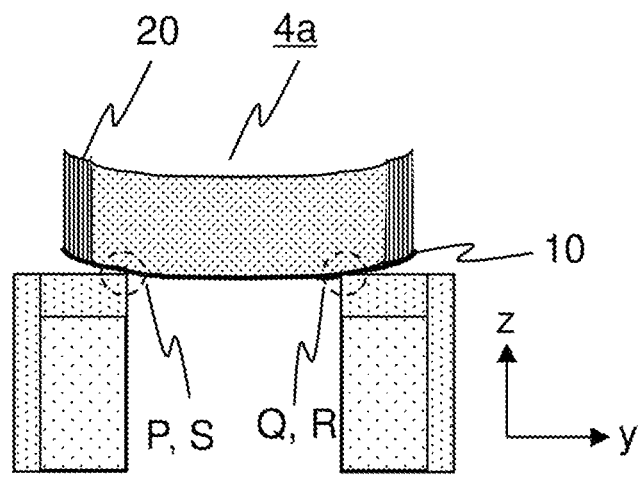

Moreover, also in any one of Embodiments 1 to 5 above, the explanation has been made for those filters by presuming that their properties of material are uniformly made in their entirety; however, it is not necessarily limited to this. As shown in FIGS. 6A and 6B, by using filters 4a of the structures each of which has four-corner portions 20 in which four corners of curved planes of the filters each opposing to each other are mutually interconnected, where the four corners are portions being provided at outer side regions of contacts with a holder, and having negligible differences as optical characteristics, but having higher specific gravities in comparison with the inner side region, it becomes possible to reduce the inclination angles due to self-weight effects of the portions of the outer side regions, even when inclination of the aforementioned filters is caused; and thus, as a result, it becomes possible to more effectively curb mutually causing the differences of inclination angles between the plurality of filters themselves.

Embodiment 6

Hereinafter, the explanation will be made referring to the drawings for an optical multiplexer/demultiplexer according to Embodiment 6.

Figure 7:
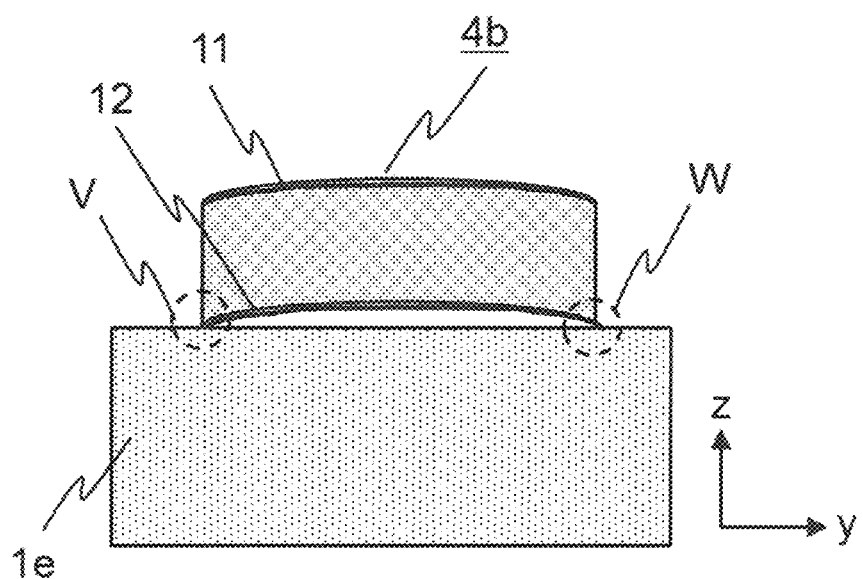
FIG. 7 is a diagram for explaining an example of an optical multiplexer/demultiplexer according to Embodiment 6.

FIG. 7 is a diagram for explaining an example of the optical multiplexer/demultiplexer according to Embodiment 6. In the embodiment, differing from any one of the embodiments described above, filters 4b each being optical components are connected onto a holder 1e in which the filters, although they are warped in a thickness-wise direction, have curved planes, i.e. an adhesion surface with a holder and a surface on its opposing side, which are formed in concave planes (in FIG. 7, the curved planes each having the curvature taking on the shapes being upwardly convex). As shown in FIG. 7, in the detailed structure of the filters 4b each, surface treatment films are coated on both of their top-face side surface and bottom-face side surface, differing from the filters 4 each of FIG. 1B and FIG. 1C. However, there is no optical reflection function on a surface treatment film 11 of the top-face side surface, and so, only a surface treatment film 12 of the bottom-face side surface is made as an optical reflection layer or film. Note that, as for the holder 1e, an oblong hole portion may be formed or not formed.

In a case in which filters each being an optical component have warped surfaces, and also a case in which those surfaces are the curved planes whose connecting surfaces with the holder 1e have convex shapes in the z-axis direction (refer to FIG. 7), the filters 4b each result in having contacts with the holder 1e at a plurality of positions (refer to an end-tip portion "V" and an end-tip portion "W" in FIG. 7) in a similar manner to the cases in Embodiments 1 to 5.

As noted above, in the embodiment, filters each result in having contacts at the end-tip portions thereof with respect to a holder, and thus, it becomes possible to curb causing the differences between inclination angles of the plurality of filters themselves with respect to the holder after the filters have been connected on the holder.

Note that, in the disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations. Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment. To be specific, in the manner described above, the explanation has been made for a case in which opposing two surfaces of a filter both form curved planes thereon; however, it is not necessarily limited to this. Similar effects can be achieved even in a case of a filter whose curved plane is formed only on one surface on a side having contact with a holder. Moreover, the exemplary explanation is made for the number of filters which is three; however, it is not necessarily limited to this. Similar effects can be achieved even in a case of a plurality of filters, other than the three.

EXPLANATION OF NUMERALS AND SYMBOLS

Numeral "1," and symbols "1a," "1b," "1c," "1d" and "1e" each designate a holder; "2," "2a," "2b," recessed portion; "3," "3a," "3b," "3c," paired structural member; "4," "4a," "4b," filter (optical component); "5," integrated structure member; "6," cylindrical-shaped structure member; "7," circular-shaped hole; "8," columned structure member; "9," "9a," "9b," oblong hole portion; "10," "11," "12," surface treatment film; "20," four-corner portion; "P," "Q," "R," "S," "T," "U," edge portion; and "V," "W," end-tip portion.

What is claimed is:

1. An optical multiplexer/demultiplexer, comprising:
a holder, being either light-transmissive or metal, including a recessed portion formed on one surface in the optical multiplexer/demultiplexer's body in a rectangular parallelepiped shape whose shape of boundary line with the one surface is rectangular, and a plurality of structural members arranged in pairs when viewed from the one surface, contacting with portions of opposing longer segments of the boundary line, or between longitudinal sections approximately equal to portions of the opposing longer segments thereof; and
a plurality of optical components, each having a curved shape and a curved surface having a coating of a surface treatment film, wherein
for each pair of the structural members, one of the optical components is positioned to overlap the structural members so that the curved surface of the optical component makes contacts with the holder and is connected on the holder to three edge portions of the holder at positions of the contacts with the holder by which a plane is formed.

2. The optical multiplexer/demultiplexer as set forth in claim 1, wherein the structural members are placed in a plurality of groups at positions mutually separating in predetermined intervals, so that the structural members each have contacts in pairs with portions of opposing two longer segments of a boundary line of the recessed portion from outer lateral sides of the recessed portion when viewed from the one surface.

3. The optical multiplexer/demultiplexer as set forth in claim 1, wherein the structural members are each made of columned structure members or cylindrical-shaped structure members, and are each in contact with the optical components on inner circumferential contour lines of the columned structure members or on those of the cylindrical-shaped structure members.

4. The optical multiplexer/demultiplexer as set forth in claim 2, wherein the recessed portion is made by a hole or a channel, and channels are formed in the structural members each on the one surface side of the optical multiplexer/demultiplexer's body.

5. The optical multiplexer/demultiplexer as set forth in claim 2, wherein the recessed portion and the structural members are both made by holes.

6. The optical multiplexer/demultiplexer as set forth in claim 2, wherein
the recessed portion is made by a hole or a channel; and
the structural members are made of either a light-transmissive material or a metal material, and holes or channels are formed in the structural members each on the one surface side in the optical multiplexer/demultiplexer's body.

7. The optical multiplexer/demultiplexer as set forth in claim 2, wherein the holder has an integrated structure member constituted of a recessed portion made of a light-transmissive material, and of structural members, made of either a light-transmissive material or a metal material, in which holes are formed in the optical multiplexer/demultiplexer's body, or channels are formed on the one surface side therein.

8. The optical multiplexer/demultiplexer as set forth in claim 2, wherein each of the optical components is made of a material whose specific gravity of regions of the optical component interconnecting between four corners of perimeter portions in the curved surface each is higher than that of portions other than the regions.

9. The optical multiplexer/demultiplexer as set forth in claim 1, wherein the curved surfaces of the optical components are each formed in a convex shape or a concave shape.

10. The optical multiplexer/demultiplexer as set forth in claim 2, wherein the curved surfaces of the optical components are each formed in a convex shape or a concave shape.

11. The optical multiplexer/demultiplexer as set forth in claim 3, wherein the curved surfaces of the optical components are each formed in a convex shape or a concave shape.

12. The optical multiplexer/demultiplexer as set forth in claim 4, wherein the curved surfaces of the optical components are each formed in a convex shape or a concave shape.

13. The optical multiplexer/demultiplexer as set forth in claim 5, wherein the curved surfaces of the optical components are each formed in a convex shape or a concave shape.

14. The optical multiplexer/demultiplexer as set forth in claim 6, wherein the curved surfaces of the optical components are each formed in a convex shape or a concave shape.

15. The optical multiplexer/demultiplexer as set forth in claim 7, wherein the curved surfaces of the optical components are each formed in a convex shape or a concave shape.

16. The optical multiplexer/demultiplexer as set forth in claim 8, wherein the curved surfaces of the optical components are each formed in a convex shape or a concave shape.

* * * * *